Jan. 8, 1924.

A. SHIMKUS

WASHBOARD

Filed Sept. 25, 1922

1,480,474

Inventor
Aleck Shimkus,

By G. Hume Talbert
Attorney

Patented Jan. 8, 1924.

1,480,474

UNITED STATES PATENT OFFICE.

ALECK SHIMKUS, OF HAMTRAMCK, DETROIT, MICHIGAN.

WASHBOARD.

Application filed September 25, 1922. Serial No. 590,412.

*To all whom it may concern:*

Be it known that ALECK SHIMKUS, a citizen of the United States of America, residing at Hamtramck, Detroit, in the county of Wayne and State of Michigan, has invented new and useful Improvements in Washboards, of which the following is a specification.

The object of the invention is to provide a washboard with readily adjustable means for receiving and feeding the cake of soap in convenient position with relation to the surface of the board whereby the exposed surface of the cake may be maintained in substantially the same plane as the board surface and therefore in convenient position to receive the rubbing action of fabrics which are being manipulated on the washboard surface; and with this object in view the invention consists in a construction and combination of parts of which a preferred embodiment is shown in the accompanying drawings, wherein:—

Figure 1:
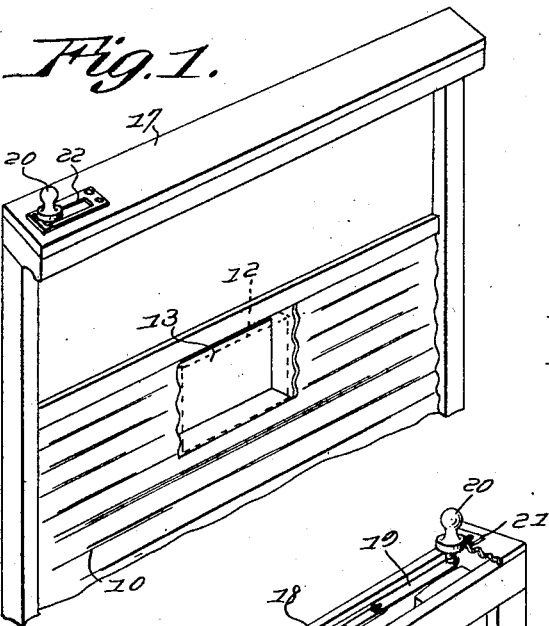
Figure 1 is a view of a washboard provided with a soap tray and feeding device constructed in accordance with the invention.
Figure 2:
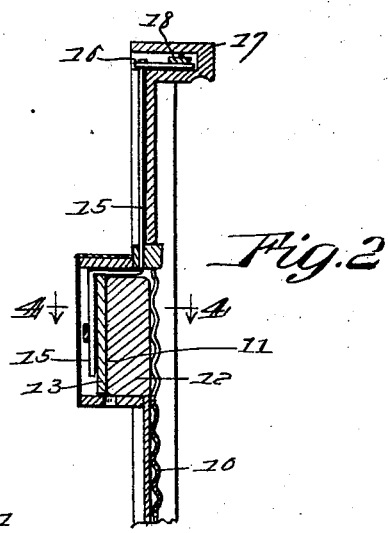
Figure 2 is a vertical sectional view of the same.
Figure 3:
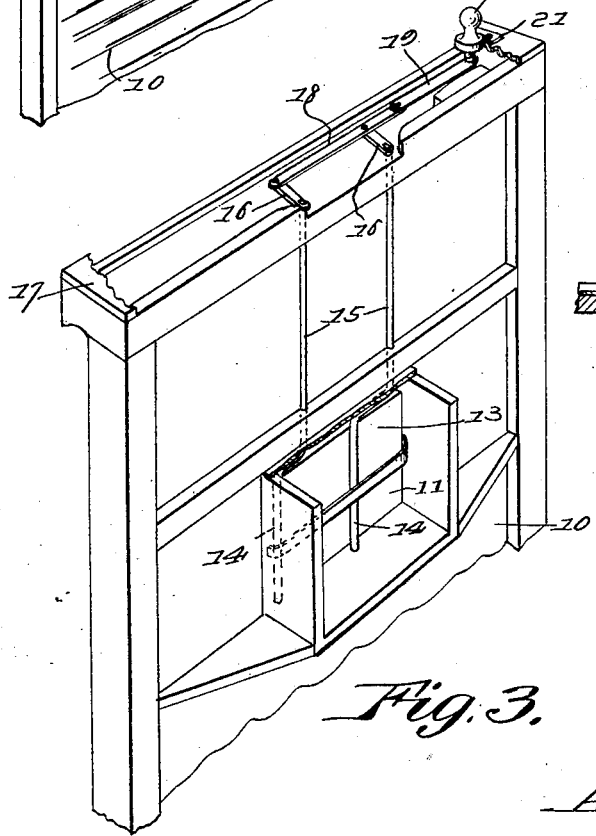
Figure 3 is a rear view partly broken away to show the connections between the operating knob and the plunger carrying cranks.
Figure 4:
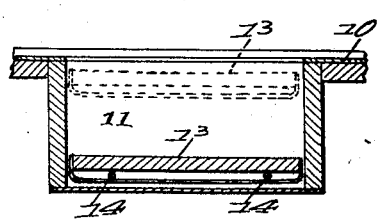
Figure 4 is a transverse sectional view on the plane indicated by the line 4—4 of Figure 2.

The washboard surface 10 is preferably cut away near its upper end to form a seat 11 for the reception of a soap cake 12 which is thus seated with its exposed surface practically in the plane of the rubbing surface of the board, and mounted in said opening or seat for movement toward and from the plane of the rubbing surface of the board is a plunger 13 carried by the crank arms 14 of rock shafts 15 mounted on the frame of the board and provided at their upper ends with operating arms 16. Mounted in the head end 17 of the board frame is a slide bar 18 having a link 19 carrying an operating knob 20 which is exposed at the head end of the board within convenient reach of the operator and with its stem 21 extending through a slot 22 in said board head.

With the parts in the retracted position which they assume when a full thickness cake of soap is arranged in the seat, and with the surface of the cake substantially in the same plane with the rubbing surface of the board, it will be obvious that the wearing of the cake by use may readily be compensated for by step by step movements of the operating knob to cause the advance of the plunger and therefore the projection of the soap cake toward the plane of the front surface of the board to maintain the proper relation thereof and insure the convenient application of the soap to the fabrics which are being rubbed on the board surface.

Having described the invention, what is claimed as new and useful is:—

A washboard having a seat for receiving a soap cake with the front surface of the latter substantially in the plane of the rubbing surface of the board, a plunger movably mounted in said seat for contact with the rear surface of the soap cake, an operating knob mounted upon the head of the washboard within convenient reach of the hand of the operator, and operating connections between said knob and the plunger whereby a progressive advance of the latter toward the plane of the rubbing surface may be effected, said connections including rock shafts having crank arms to which said plunger is attached and operating arms disposed adjacent to the head of the washboard, and a slide bar connected with said operating arms and having a link connection carrying said knob.

In testimony whereof he affixes his signature.

ALECK SHIMKUS.